(12) United States Patent
Busey et al.

(10) Patent No.: US 12,314,768 B1
(45) Date of Patent: May 27, 2025

(54) SYSTEMS AND METHODS FOR UPDATING A COMPUTATIONAL WORKFLOW AND PROCESSING INPUT INFORMATION SETS IN ACCORDANCE WITH THE UPDATED COMPUTATIONAL WORKFLOW

(71) Applicant: Form Bio Inc., Austin, TX (US)

(72) Inventors: Andrew Busey, Austin, TX (US); Brandi Lynn Cantarel, Richardson, TX (US); Douglas James Daniels, Jr., Austin, TX (US)

(73) Assignee: Form Bio Inc., Austin, TX (US)

( * ) Notice: Subject to any disclaimer, the term of this patent is extended or adjusted under 35 U.S.C. 154(b) by 526 days.

(21) Appl. No.: 17/866,262

(22) Filed: Jul. 15, 2022

(51) Int. Cl.
G06F 9/50 (2006.01)
G06N 3/126 (2023.01)

(52) U.S. Cl.
CPC .............. G06F 9/505 (2013.01); G06N 3/126 (2013.01)

(58) Field of Classification Search
CPC ................................. G06F 9/505; G06N 3/126
See application file for complete search history.

(56) References Cited

U.S. PATENT DOCUMENTS

| | | | |
|---|---|---|---|
| 6,986,138 B1 | 1/2006 | Sakaguchi | |
| 7,653,562 B2 | 1/2010 | Schulz | |
| 8,577,709 B2 | 11/2013 | Ohsaki | |
| 8,639,555 B1 | 1/2014 | Johnston | |
| 10,528,327 B2 | 1/2020 | Kumar | |
| 10,929,107 B2 | 2/2021 | Burman | |
| 11,609,890 B1 * | 3/2023 | Vermeulen | G06F 16/283 |
| 2003/0004770 A1 | 1/2003 | Miller | |
| 2005/0209904 A1 | 9/2005 | Hayashi | |
| 2008/0177612 A1 | 7/2008 | Starink | |
| 2010/0010953 A1 | 1/2010 | Meliksetian | |
| 2012/0095585 A1 | 4/2012 | Agarwal | |
| 2012/0096463 A1 | 4/2012 | Agarwal | |

(Continued)

FOREIGN PATENT DOCUMENTS

WO 2008092026 A1 7/2008

OTHER PUBLICATIONS

Singh, Alok, et al. "A machine learning approach for modular workflow performance prediction." Proceedings of the 12th workshop on workflows in support of large-scale science. 2017. (Year: 2017).

*Primary Examiner* — Sisley N Kim
(74) *Attorney, Agent, or Firm* — Esplin & Associates, PC

(57) ABSTRACT

System and method for updating a computational workflow and processing input information sets in accordance with the updated computational workflows. Exemplary implementations may: store workflow definitions for computational workflows, computational modules, output information sets, and/or other information; receive update information corresponding to the first computational workflow; update the first workflow definition in accordance with the update information to generate an updated workflow definition for the first computational workflow; process the first input information set in accordance with the updated workflow definition to generate a second output information set; determine variance information documenting variation between the first output information set and the second output information set; output one or more of the second output information set or the variance information; and/or other exemplary implementations.

20 Claims, 3 Drawing Sheets

(56) References Cited

U.S. PATENT DOCUMENTS

| | | |
|---|---|---|
| 2014/0025425 A1 | 1/2014 | Chalana |
| 2015/0039382 A1 | 2/2015 | Kim |
| 2016/0034809 A1 | 2/2016 | Trenholm |
| 2017/0017912 A1 | 1/2017 | Teraguchi |
| 2017/0039492 A1 | 2/2017 | Henke |
| 2017/0147296 A1 | 5/2017 | Kumar |
| 2017/0315714 A1 | 11/2017 | Shyamsundar |
| 2017/0315789 A1 | 11/2017 | Lam |
| 2017/0316355 A1 | 11/2017 | Shrestha |
| 2018/0089602 A1 | 3/2018 | Elvira |
| 2018/0240051 A1 | 8/2018 | Chen |
| 2019/0026663 A1 | 1/2019 | Homeyer |
| 2019/0129769 A1 | 5/2019 | Frech |
| 2019/0213040 A1* | 7/2019 | Ohba .................. G06F 9/526 |
| 2019/0279127 A1 | 9/2019 | Togo |
| 2020/0012977 A1 | 1/2020 | Lehmann |
| 2020/0151288 A1* | 5/2020 | Ma .................... G06F 30/327 |
| 2020/0202273 A1 | 6/2020 | Lehmann |
| 2020/0301678 A1 | 9/2020 | Burman |
| 2022/0374793 A1* | 11/2022 | Jezewski ............... G06N 5/04 |
| 2022/0411881 A1* | 12/2022 | Kural .................. C12Q 1/6883 |
| 2023/0316188 A1* | 10/2023 | Vasileiadis ........... G06Q 10/06 705/7.27 |

\* cited by examiner

SYSTEMS AND METHODS FOR UPDATING A COMPUTATIONAL WORKFLOW AND PROCESSING INPUT INFORMATION SETS IN ACCORDANCE WITH THE UPDATED COMPUTATIONAL WORKFLOW

FIELD OF THE DISCLOSURE

The present disclosure relates to systems and methods for updating a computational workflow and processing input information sets in accordance with the updated computational workflows.

BACKGROUND

Methods for modularizing computational processes are known. Methods for customizing computational workflows are known. Bioinformatics programs for converting between file types and/or formats, performing analyses on biological data, and/or performing other functions are known.

SUMMARY

Computational modules may be selected and/or arranged to customize a computational workflow for processing information. The computational modules may be selected and/or arranged in a relative order that defines the computational workflow and/or the order of operations that are performed on inputs to the computational workflow. Updates to computational workflows may become available after the computational workflows have been used to process inputs to produce outputs. The updates to the computational workflows may include updates to the computational modules included in the computational workflows and/or other components of the computational workflows. The updates may provide improvements by modifying (i.e., providing new versions of) the computational workflows and/or altering the way inputs are processed by the computational workflows.

One or more aspects of the present disclosure include a system for updating a computational workflow and processing input information sets in accordance with the updated computational workflows. The system may include electronic storage, one or more hardware processors configured by machine-readable instructions and/or other components. Executing the machine-readable instructions may cause the one or more hardware processors to facilitate updating a computational workflow and processing input information sets in accordance with the updated computational workflow. The machine-readable instructions may include one or more computer program components. The one or more computer program components may include one or more of an information component, an update component, a workflow component, a variance component, an output component, and/or other components The electronic storage may be configured to store workflow definitions for computational workflows, computational modules, output information sets, and/or other information. The output information sets may be generated by the computational workflows. Workflow definitions may specify one or more computational modules and relative orders of the computational modules to configure the computational workflows. The computational modules may define separate sets of operations to perform on module inputs to the computational modules to produce module outputs. Computational workflows may receive input information sets that are processed in accordance with the corresponding workflow definitions to generate output information sets. By way of non-limiting illustration, the electronic storage may store a first workflow definition for a first computational workflow, a first output information set, and/or other information. The first workflow definition may specify a first computational module to configure the first computational workflow. The first output information set may be generated by processing a first input information set in accordance with the first workflow definition.

The information component may be configured to receive update information corresponding to the first computational workflow, and/or other information. The update information may specify updates to one or more of the computational modules and/or the relative orders of computational modules specified by the workflow definitions.

The update component may be configured to update the first workflow definition in accordance with the update information to generate an updated workflow definition for the first computational workflow. Updating the first workflow definition may include updating the first computational module to generate an updated computational module. The updated workflow definition may specify the updated computational module to configure the first computational workflow. The first computational module and the updated computational module may define separate sets of operations that perform the same and/or similar functions.

The workflow component may be configured to process the first input information set in accordance with the updated workflow definition to generate a second output information set. Processing may include providing the first input information set and/or information derived thereof as module input to the updated computational module to generate module output. The second output information set may include the module output from the updated computational module and/or information derived thereof.

The variance component may be configured to determine variance information and/or other information. The variance information may document variation between the first output information set and the second output information set.

The output component may be configured to output one or more of the second output information set, the variance information, and/or other information.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
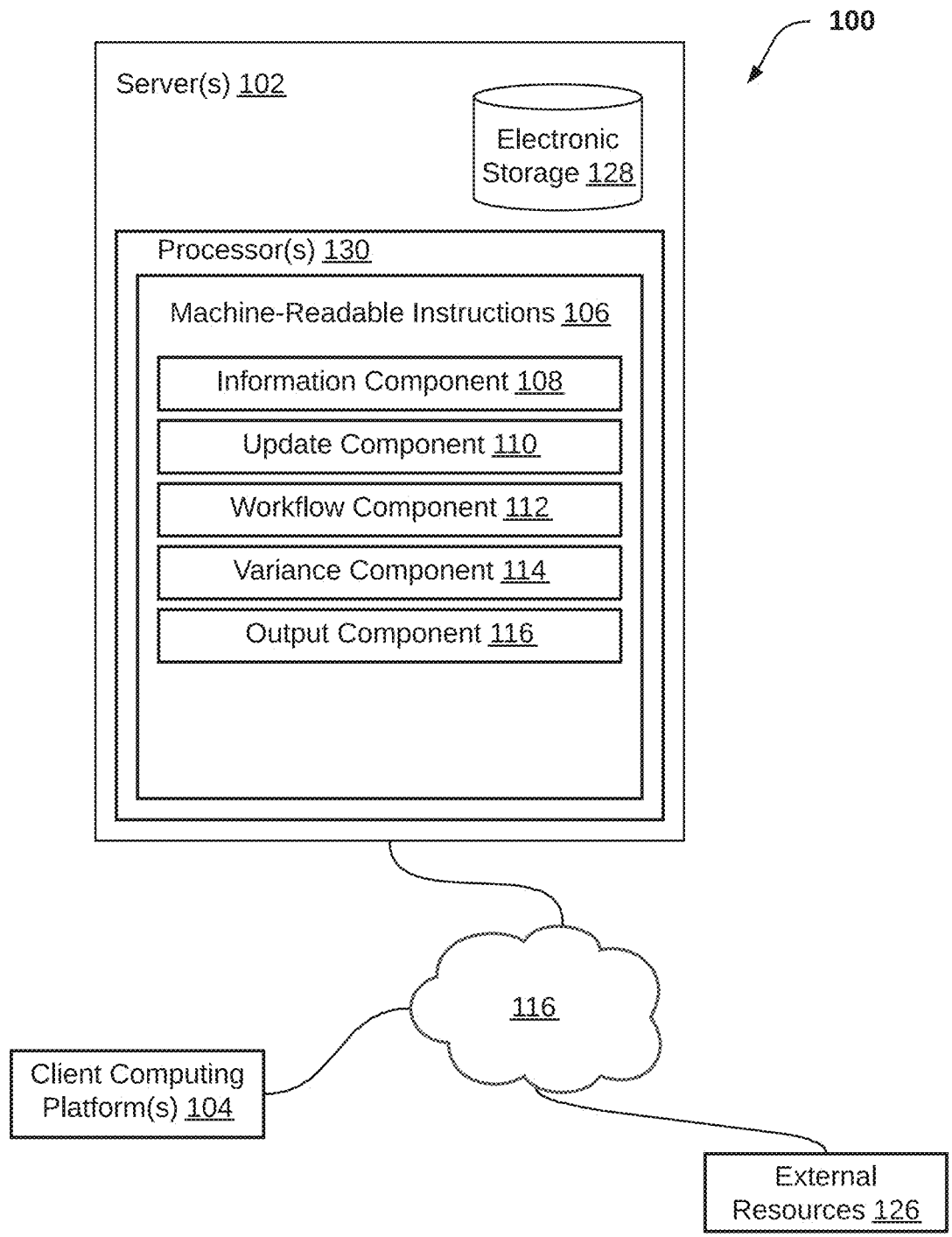
FIG. 1 illustrates a system for updating a computational workflow and processing input information sets in accordance with the updated computational workflows, in accordance with one or more implementations.

FIG. 1 illustrates a system 100 configured for updating a computational workflow and processing input information sets in accordance with the updated computational workflows, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information component 108, update component 110, workflow component 112, variance component 114, output component 116, and/or other instruction components.

Electronic storage 128 may be configured to store workflow definitions for computational workflows, computational modules, output information sets, and/or other information. Workflow definitions may specify one or more computational modules and relative orders of the computational modules to configure the computational workflows. The computational modules may define separate sets of operations to perform on module inputs to the computational modules to produce module outputs. Individual ones of the computational modules may be configured to perform transformations, conversions, analysis, and/or other types of processes on module input(s) to the computational module to produce module output(s). By way of non-limiting illustration, individual computational modules may include sets of computational operations to perform on module inputs having a first format to produce module outputs having a second format. The first format may be different than the second format.

In some implementations, computational modules may be functionally analogous. Computational modules that are functionally analogous may produce module outputs having the same output format, and/or module outputs that share other characteristics. Computational modules that are functionally analogous may define separate sets of computational operations that perform the same calculations in a different order, perform the same functions using different calculations, and/or other variations. In some implementations, module outputs produced by computational modules that are functionally analogous may also be functionally analogous. By way of non-limiting illustration, a first module output including a first genomic sequence may be produced by a first computational module and a second module output including a second genomic sequence may be produced by a second computational module. The first genomic sequence and the second genomic sequence may be functionally analogous by virtue of the first computational module and the second computational module being functionally analogous. The first genomic sequence and the second genomic sequence being functionally analogous may indicate the first genomic sequence and the second genomic sequence result in production of the same and/or similar compounds during a manufacturing process. In some implementations, computational modules may be obtained (i.e., imported) from external resources 126, via network(s) 116, and/or other components of system 100.

The output information sets may be generated by the computational workflows. Generating the output information sets may include processing input information sets in accordance with the workflow definitions. Computational workflows may receive input information sets and/or other information. The sets of operations defined by the computational modules may be performed on the input information sets in an order according to the relative orders of computational modules specified by the workflow definitions. In some implementations, relative orders of computational modules may include one or more sets of adjacent computational modules. The adjacent computational modules may include a providing computational module and a receiving computational module. Module outputs produced by the providing computational module and/or information derived thereof may be provided as module input to the receiving computational module. The set of operations defined by the receiving computational module may be performed on the module input to the receiving computational module (i.e., the module output from the providing computational module).

By way of non-limiting illustration, the electronic storage may store a first workflow definition for a first computational workflow, a first output information set, and/or other information. The first workflow definition may specify a first computational module to configure the first computational workflow. The first output information set may be generated by processing a first input information set in accordance with the first workflow definition.

Information component 108 may be configured to receive update information corresponding to the first computational workflow, and/or other information. The update information may specify updates to one or more of the computational modules and/or the relative orders of computational modules specified by the workflow definitions. In some implementations update information may be received from external resources 126, via network(s) 116, and/or other components of system 100. External resources 126 may include one or more repositories, databases, directories, and/or other data structures for storing information. The repositories may be distributed repositories (e.g., Git repository, Mercurial repository) or centralized repositories for storing information associated with the computational workflows. In some implementations, information component 108 may be configured to monitor one or more repositories and/or other databases for update information. By way of non-limiting illustration, submissions of new information and/or other types of changes to a repository may effectuate information component 108 receiving update information. The receipt of update information by information component 108 may be automatic and/or at the request of a user. A request for update information may be initiated by a user (i.e., via client computing platform(s) 104) and/or other components of system 100.

In some implementations, update information may include updated versions of computational workflows and/or other information. The updated versions of the computational workflows may include updated versions of one or more computational modules specified by the workflow definitions. The updated versions of the one or more computational modules may replace earlier versions of the one or more computational modules to configure the computational workflows. In some implementations, a computational module and an updated version of the computational module may be functionally analogous. In some implementations, updating information may include updates that are available for input information sets previously processed to generate output information sets. Updates for the input information sets may include modifications to information included in the input information sets, the format of the input information sets, and/or other information pertaining to the input information sets. The update information may include updated versions of the input information sets and/or other information. The updated versions of the input information sets may replace the previously processed input information sets stored in electronic storage 128 and/or provided as input to the computational workflows.

In some implementations, information component 108 may receive update information at regular and/or irregular intervals of time. The intervals may be every minute, every ten minutes, every hour, every 12 hours, every 24 hours, and/or other intervals of time. Update information may correspond to individual intervals of time that are defined by a start time and an end time. The update information may include updates that became available for the computational workflows, computational modules, input information sets, and/or other information during the corresponding interval of time. By way of non-limiting illustration, first updated information may correspond with a first interval of time. Updates that became available during the first interval of time may include updates that were submitted (i.e., uploaded) to one or more databases (e.g., included in external resources 126) and/or otherwise received by information component 108.

Update component 110 may be configured to update the first workflow definition in accordance with the update information to generate an updated workflow definition for the first computational workflow. Updating the first workflow definition may include updating the first computational module to generate an updated computational module. In some implementations, updating the first computational module may include modifying the set of operations defined by the first computational module in accordance with the updating information. By way of non-limiting illustration, updating the first computational module may include removing one or more operations from the set of operations, adding one or more operations to the set of operations, rearranging operations included in the set of operations, and/or other modifications. Modifications to the set of operations defined by the first computational module and/or the first computational module may be stored in electronic storage 128.

In some implementations, updating the first computational module may include substituting the first computational module with an updated version of the first computational module (also referred to as the updated computational module). The updated versions of the first computational module may be included and/or otherwise specified in the updated information received by information component 108. The updated version of the first computational module and the first computational module may be functionally analogous. The updated version of the first computational module may define a different set of operations that performs that same or similar function to the set of operations defined by the first computational module. By way of non-limiting illustration, the same module inputs may be provided to the first computational module and the updated computational module. The module outputs produced by the first computational module may be analogous to module outputs produced by the updated computational module by virtue of the first computational module and the updated computational module being functionally analogous. In some implementations, electronic storage 128 may be configured to store one or more versions of a computational module. By way of non-limiting illustration, the first computational module may be stored as a first version and the updated computational module may be stored as a second version of the first computational module. The individual computational modules and/or versions of computational modules may be stored with an identifier and/or other identifying information. The identifier may be machine-readable or human-readable (e.g., an alphanumeric identifier). The identifier may characterize a version number associated with the individual computational module, one or more workflow definitions that specify the individual computational module, and/or other information.

In some implementations, update information may specify modifications for the workflow definitions. The modifications include adding and/or removing computational modules from the relative order of computational modules, rearranging the order of computational modules, and/or other modifications. Updating the workflow definitions may include implementing the modifications to the workflow definitions stored in electronic storage 128. The updated (i.e., modified) workflow definitions may be stored in electronic storage 128 subsequent to the modification and/or be used to configure computational workflows. In some implementations, the update information may include updated versions of corresponding workflow definitions. The updated versions of the corresponding workflow definition may replace the corresponding workflow definitions in electronic storage and/or stored as a subsequent version of the corresponding workflow definition. By way of non-limiting illustration, update information may include an updated workflow definition that corresponds to the first workflow definition. The updated workflow definition may be an updated version of the first workflow definition. The updated workflow definition may be stored in electronic storage 128 and/or identified as a second version of the first workflow definition. The first workflow definition and the updated workflow definition may specify one or more computational modules and/or relative orders of computational modules to configure computational workflows. The computational workflows configured in accordance with the first workflow definition and the updated workflow definition may be functionally analogous.

In some implementations, updating workflow definitions may include updating computational modules specified by the workflow definitions, such that the updated workflow definitions may specify one or more updated computational modules to configure computational workflows. By way of non-limiting illustration, the updated workflow definition may specify the updated computational module to configure the first computational workflow. The updated workflow definition may have been generated by updating the first workflow definition and the updated computational module may have been generated by updating the first computational module.

In some implementations, update information may include updates to input information sets that are provided to computational workflows to generate output information sets. By way of non-limiting illustration, the update information may include updates for the first input information set. Updating the first computational workflow may include updating the first input information set to generate an updated input information set. The updated input information set may be processed in accordance with the first workflow definition or the updated workflow definition to generate the second output information set. In some implementations, updates to the input information sets may include modifications to the information included in the input information sets, the format of information included in the input information set, and/or other types of modifications. Updating the input information sets may include implementing the modifications specified by the update information and/or storing the updated (i.e., modified) input information sets in electronic storage 128.

Workflow component 112 may be configured to process the first input information set in accordance with the updated workflow definition to configure the first computational workflow. The updated workflow definition may specify the updated computational module. Processing the first input information set in accordance with the updated workflow definition may generate a second output information set. Processing may include providing the first input information set and/or information derived thereof as module input to the updated computational module. The set of operations defined by the updated computational module may be performed on the module input to generate module output. The set of operations defined by the updated computational module may be characterized by an order in which the operations are performed on module inputs and/or other information. The second output information set may include the module output from the updated computational module and/or information derived thereof. In some implementations, the workflow definition may define multiple computational modules within the relative order of computational modules. The output information set generated by the computational workflows may include module output generated by the final (i.e., last) computational module in the relative order of computational modules and/or information derived thereof.

In some implementations, the first output information set and the second output information set may include similar and/or the same information and/or type of information. The first output information set and/or the second output information set may contain biological information (e.g., molecular sequence information) and/or other types of information. By way of non-limiting illustration, the first output information set may include a first representation of a genomic sequence and the second output information set may include a second representation of a genomic sequence. The first representation and the second representation may be functionally analogous by virtue of the individual representations leading to production of the same and/or similar compounds during a manufacturing process (e.g., protein synthesis).

Variance component 114 may be configured to determine variance information and/or other information. The variance information may document differences (i.e., variation(s), dissimilarity) between the first output information set and the second output information set. The variance between the first output information set and the second output information set may be caused by updates to one or more of the first workflow definition, the first computational module, the first input information set, and/or other components of and/or related to the first computational workflow. Differences between the first output information set and the second output information set may include differences between information included in the individual output information sets, and/or other aspects of the output information sets. Differences between the information included in the individual output information sets may include differences between the content of the information, the data types of the information, the format of the information, and/or other features of the information.

In some implementations, information included in the individual output information sets may include biological information and/or other information. By way of non-limiting illustration, the first representation of a genomic sequence (included in the first output information set) may include a first order of nucleotides. The second representation of a genomic sequence (included in the second output information set) may include a second order of nucleotides. Variance information documenting differences between the first output information set and the second output information set may include differences between the first order of nucleotides and the second order of nucleotides. Individual differences (i.e., individual instances of difference) between the orders of nucleotides may be defined by an index that characterizes a location within the orders of nucleotides, one or more types of nucleotides (e.g., thymine (T), adenine (A), cytosine (C), guanine (G)), and/or other information. For example, variance information may document a first difference occurring at a first index. The first order of nucleotides may have a first type of nucleotide at the first index and the second order of nucleotides may have a second type of nucleotide at the first index. The first index may characterize the same location on the first order of nucleotides and the second order of nucleotides. By way of non-limiting illustration, variance information may document differences in quality scores associated with the first representation of a genomic sequence and the second representation of a genomic sequence.

Output component 116 may be configured to output one or more of the second output information set, the variance information, and/or other information. In some implementations, output component 116 may be configured to output one or more of the updated computational workflows to configure the first computational workflow, the updated computational module, and/or other information. Information may be outputted to one or more users via client computing platform(s) 104 and/or other components of system 100.

In some implementations, output component 116 may be configured to provide notifications to a user responsive to the variance information indicating differences between the first output information set and the second output information set. Notifications may characterize the variance between the first output information set and the second output information set and/or be based on the determined variance information. By way of non-limiting illustration, notifications may specify locations (e.g., indexes within orders of nucleotides, line numbers, etc.) within the output information sets where variance occurs. Notifications may include descriptions (e.g., summaries) of instances of variance within the output information sets. In some implementations, notifications may be provided to the users via one or more user interfaces of client computing platform(s) 104. The user interfaces may include one or more user interface elements representing individual notifications that specify individual instances of variance between the output information sets. Individual user interface elements may represent multiple instances of variance between the output information sets that are documented by the variance information. In some implementations, output component 116 may be configured to generate visual summaries of the variance information and/or other information. The visual summaries may characterize instances of variance (i.e., differences) between the first output information set and the second output information set documented in the variance information. The visual summaries may include graphs, charts, text descriptions, and/or other types of summaries.

Figure 3:
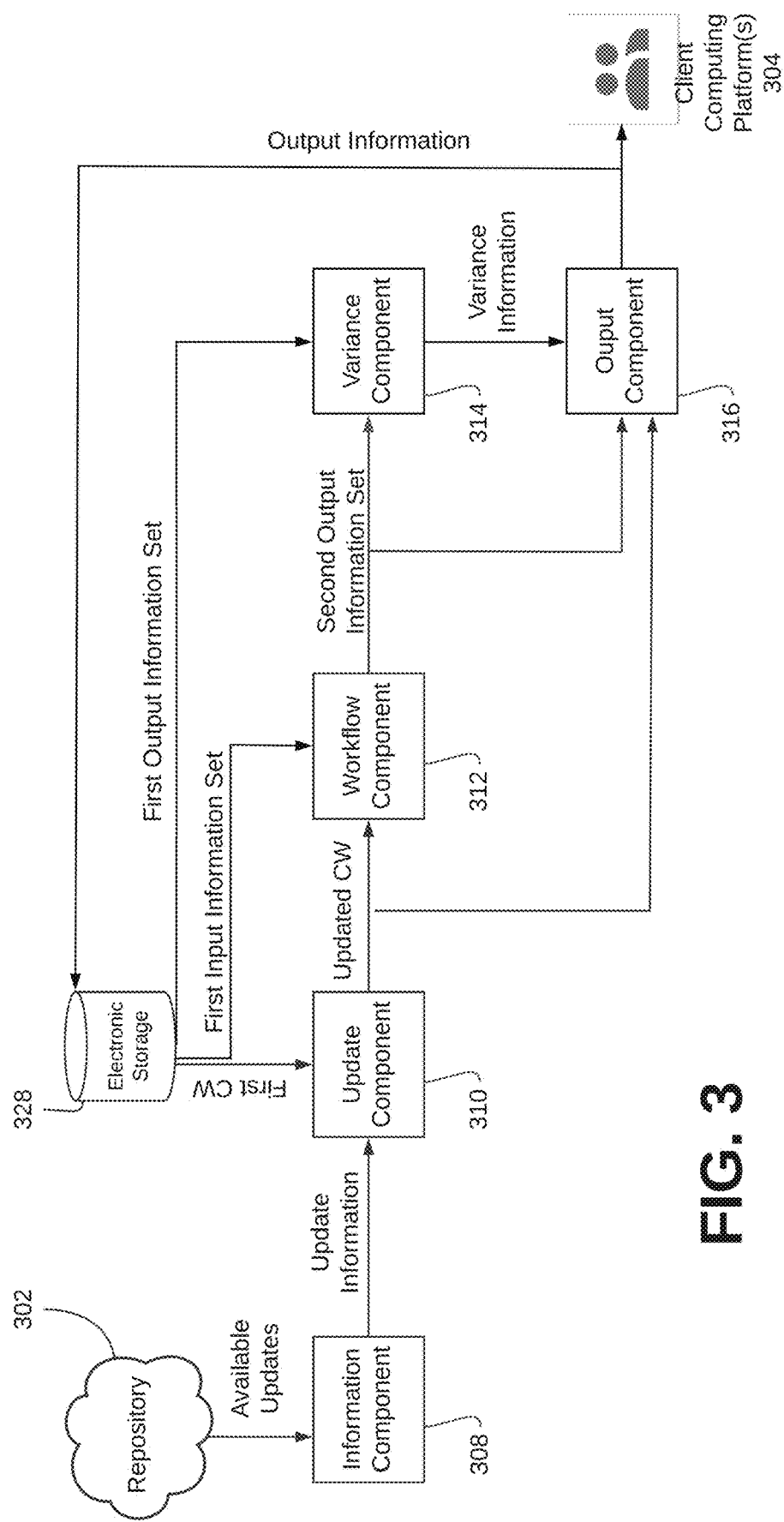
FIG. 3 illustrates an exemplary implementation of the system for updating a computational workflow and processing input information sets in accordance with the updated computational workflows, in accordance with one or more implementations.

FIG. 3 illustrates an exemplary implementation of a system configured to identify and address information format incompatibility within a computational workflow. The exemplary implementations may include a repository 302, information component 308, updating component 310, workflow component 312, variance component 314, output component 316, electronic storage 328, one or more client computing platform(s) 304, and/or other components. Repository 302 may include one or more databases and/or other data structures. Available updated from repository 302 may be received by information component 308 (which may be the same as or similar to information component 108 shown in FIG. 1). Available updates may be provided to information component 308 responsive to new updates being submitted and/or uploaded to repository 302. Information component 308 may provide the update information to update component 310 (which may be the same as or similar to update component 110 shown in FIG. 1). Update component 310 may be configured to obtain a first computational workflow (labeled "First CW") from electronic storage 328 (which may be the same as or similar to electronic storage 128 shown in FIG. 1). The first computational workflow may be defined by a first workflow definition specifying a first computational module, and/or other information. Update component 310 may be configured to update the first computational workflow in accordance with the update information to generate an updated computational workflow (labeled "Updated CW"). The update computational workflow generated by update component 310 may be provided to workflow component 312 (which may be the same as or similar to workflow component 112 shown in FIG. 1). Workflow component 312 may be configured to obtain a first input information set and/or other information from electronic storage 328. Workflow component 328 may be configured to process the first input information set in accordance with the updated computational workflow and/or a workflow definition defining the updated computational workflow. Processing the first input information set in accordance with the updated computational workflow may generate a second output information set. The second output information set may be provided to variance component 314 (which may be the same as or similar to variance component 114 shown in FIG. 1). Variance component 314 may be configured to obtain a first output information set and/or other information from electronic storage 328. The first output information set may be generated by processing the first input information set in accordance with the first computational workflow. Variance component 314 may be configured to determine variance information documenting variance between the first output information set and the second output information set. Output component 316 (which may be the same as or similar to output component 116 shown in FIG. 1) may configured to obtain the updated computational workflow, the second output information set, variance information, and/or other information. Output component 316 may be configured to provide the updated computational workflow, the second output information set, variance information, and/or other output information to electronic storage 328 (i.e., to be stored in electronic storage 328) or users via client computing platform(s) 304.

Referring to FIG. 1, server(s) 102, client computing platform(s) 104, and/or external resources 126 may be operatively linked via one or more electronic communication links. By way of non-limiting illustration, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. By way of non-limiting illustration, server(s) 102 may be implemented by a cloud of computing platforms operating together as server(s) 102.

Electronic storage 128 may comprise non-transitory storage media that electronically stores information. In some implementations, electronic storage 128 may be configured to store one or more of the updated workflow definitions to configure the first computational module, the updated computational module, the second output information set, the variance information, and/or other information. In some implementations, the first output information set may be stored in association with the first workflow definition. The second output information set may be stored in association with the updated workflow definition. In some implementations, the updated workflow definition may be stored as a second version of the first workflow definition to configure the first computational workflow.

The electronic storage media of electronic storage 128 may include one or both of system storage that is provided integrally (i.e., substantially non-removable) with server(s) 102 and/or removable storage that is removably connectable to server(s) 102 via, By way of non-limiting illustration, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or 116, and/or other components. Processor(s) 130 may be configured to execute components 108, 110, 112, 114, and/or 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. By way of non-limiting illustration, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 2:
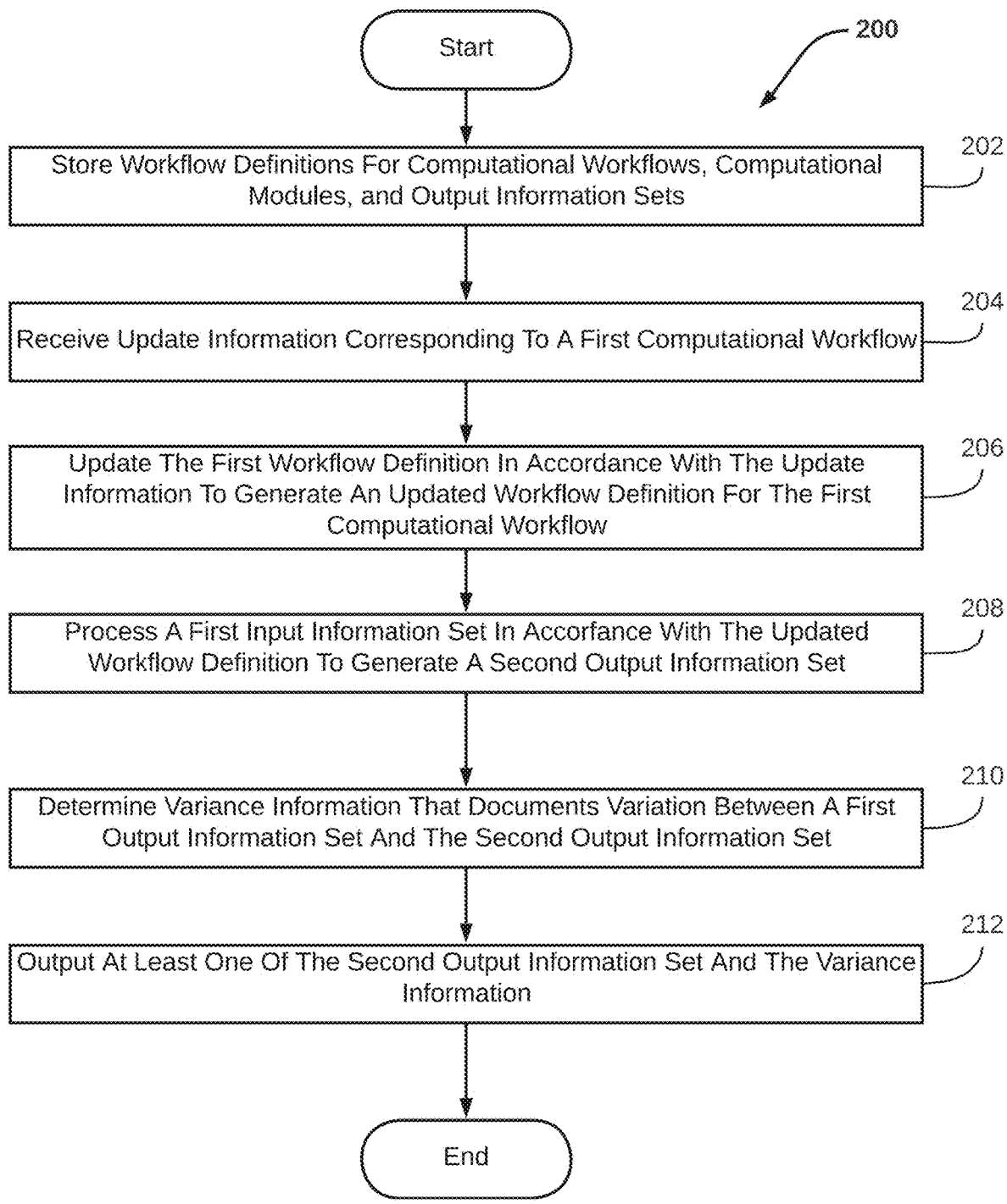
FIG. 2 illustrates a method for updating a computational workflow and processing input information sets in accordance with the updated computational workflows, in accordance with one or more implementations.

FIG. 2 illustrates a method 200 for updating a computational workflow and processing input information sets in accordance with the updated computational workflows, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing workflow definitions for computational workflows, computational modules, output information sets, and/or other information. The output information sets may be generated by the computational workflows. Workflow definitions may specify one or more computational modules and relative orders of the computational modules to configure the computational workflows. The computational modules may define separate sets of operations to perform on module inputs to the computational modules to produce module outputs. Computational workflows may receive input information sets that are processed in accordance with the corresponding workflow definitions to generate output information sets. By way of non-limiting illustration, the electronic storage may store a first workflow definition for a first computational workflow, a first output information set, and/or other information. The first workflow definition may specify a first computational module to configure the first computational workflow. The first output information set may be generated by processing a first input information set in accordance with the first workflow definition. Operation 202 may be performed by a component that is the same as or similar to electronic storage 128, in accordance with one or more implementations.

An operation 204 may include receiving update information corresponding to the first computational workflow, and/or other information. The update information may specify updates to one or more of the computational modules and/or the relative orders of computational modules specified by the workflow definitions. Operation 204 may be performed by one or more hardware processors configured by machine-readable instructions including a component that is the same as or similar to information component 108, in accordance with one or more implementations.

An operation 206 may include updating the first workflow definition in accordance with the update information to generate an updated workflow definition for the first computational workflow. Updating the first workflow definition may include updating the first computational module to generate an updated computational module. The updated workflow definition may specify the updated computational module to configure the first computational workflow. The first computational module and the updated computational module may define separate sets of operations that perform the same and/or similar functions. Operation 206 may be performed by one or more hardware processors configured by machine-readable instructions including a component that is the same as or similar to update component 110, in accordance with one or more implementations.

An operation 208 may include processing the first input information set in accordance with the updated workflow definition to generate a second output information set. Processing may include providing the first input information set and/or information derived thereof as module input to the updated computational module to generate module output. The second output information set may include the module output from the updated computational module and/or information derived thereof. Operation 208 may be performed by one or more hardware processors configured by machine-readable instructions including a component that is the same as or similar to workflow component 112, in accordance with one or more implementations.

An operation 210 may include determining variance information and/or other information. The variance information may document variation between the first output information set and the second output information set. Operation 210 may be performed by one or more hardware processors configured by machine-readable instructions including a component that is the same as or similar to variance component 114, in accordance with one or more implementations.

An operation 212 may include outputting one or more of the second output information set, the variance information, and/or other information. Operation 212 may be performed by one or more hardware processors configured by machine-readable instructions including a component that is the same as or similar to output component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. By way of non-limiting illustration, it is to be understood that the present technology contemplates that, to the extent possible, one or more features of any implementation can be combined with one or more features of any other implementation.

What is claimed:

1. A system configured to update a computational workflow and process input information sets in accordance with the updated computational workflow, the system comprising:

electronic storage that stores workflows definitions for computational workflows, computational modules, and output information sets generated by the computational workflows, wherein workflow definitions specify one or more computational modules and relative orders of the computational modules to configure the computational workflows, wherein the computational modules define separate sets of operations to perform on module inputs to the computational modules to produce module outputs, wherein computational workflows receive input information sets that are processed in accordance with the corresponding workflow definitions to generate output information sets, wherein electronic storage stores a first workflow definition for a first computational workflow and a first output information set, the first workflow definition specifying a first computational module to configure the first computational workflow, and the first output information set being generated by processing a first input information set in accordance with the first workflow definition;

one or more physical processors configured by machine-readable instructions to:

receive update information corresponding to the first computational workflow, wherein update information specifies updates to at least one of the computational modules and the relative orders of computational modules specified by the workflow definitions;

update the first workflow definition in accordance with the update information to generate an updated workflow definition for the first computational workflow, wherein updating the first workflow definition includes updating the first computational module to generate an updated computational module, wherein the updated workflow definition specifies the updated computational module to configure the first computational workflow, and wherein the first computational module and the updated computational module define separate sets of operations that perform the same function;

process the first input information set in accordance with the updated workflow definition to generate a second output information set, wherein processing includes providing the first input information set and/or information derived thereof as module input to the updated computational module to generate module output, wherein the second output information set includes the module output from the updated computational module and/or information derived thereof;

determine variance information that documents variation between the first output information set and the second output information set; and output at least one of the second output information set and the variance information.

2. The system of claim 1, wherein the one or more physical processors are further configured by machine-readable instructions to:

provide notifications to a user responsive to the variance information indicating differences between the first output information set and the second output information set.

3. The system of claim 1, wherein the first output information set and the second output information include at least one of biological information and/or molecular sequence information.

4. The system of claim 1, wherein updating the first computational module includes removing one or more operations from the set of operations, adding one or more operations to the set of operations, and/or rearranging operations included in the set of operations.

5. The system of claim 1, wherein the update information includes updates to the first input information set, wherein updating the first computational workflow includes updating the first input information set to generate an updated input information set, and wherein the updated input information set is processed in accordance with the first workflow definition to generate the second output information set.

6. The system of claim 1, wherein the one or more physical processors are further configured by machine-readable instructions to:

generate visual summaries of the variance information, wherein the visual summaries characterize differences between the first output information set and the second output information set documented in the variance information.

7. The system of claim 1, wherein the first computational module and the updated computational module are functionally analogous.

8. The system of claim 1, wherein the one or more physical processors are further configured by machine-readable instructions to:

store at least one of the updated workflow definitions to configure the first computational module, the updated computational module, the second output information set, or the variance information in electronic storage.

9. The system of claim 8, wherein the first output information set is stored in association with the first workflow definition, and wherein the second output information set is stored in association with the updated workflow definition.

10. The system of claim 8, wherein the updated workflow definition is stored as a second version of the first workflow definition to configure the first computational workflow.

11. A method to update a computational workflow and process input information sets in accordance with the updated computational workflow, the method comprising:
storing workflows definitions for computational workflows, computational modules, and output information sets generated by the computational workflows, wherein workflow definitions specify one or more computational modules and relative orders of the computational modules to configure the computational workflows, wherein the computational modules define separate sets of operations to perform on module inputs to the computational modules to produce module outputs, wherein computational workflows receive input information sets that are processed in accordance with the corresponding workflow definitions to generate output information sets, including storing a first workflow definition for a first computational workflow and a first output information set, the first workflow definition specifying a first computational module to configure the first computational workflow, and the first output information set being generated by processing a first input information set in accordance with the first workflow definition;
receiving update information corresponding to the first computational workflow, wherein update information specifies updates to at least one of the computational modules and the relative orders of computational modules specified by the workflow definitions;
updating the first workflow definition in accordance with the update information to generate an updated workflow definition for the first computational workflow, wherein updating the first workflow definition includes updating the first computational module to generate an updated computational module, wherein the updated workflow definition specifies the updated computational module to configure the first computational workflow, and wherein the first computational module and the updated computational module define separate sets of operations that perform the same function;
processing the first input information set in accordance with the updated workflow definition to generate a second output information set, wherein processing includes providing the first input information set and/or information derived thereof as module input to the updated computational module to generate module output, wherein the second output information set includes the module output from the updated computational module and/or information derived thereof;
determining variance information that documents variation between the first output information set and the second output information set; and
outputting at least one of the second output information set and the variance information.

12. The method of claim 11, wherein the method further includes:
providing notifications to a user responsive to the variance information indicating differences between the first output information set and the second output information set.

13. The method of claim 11, wherein the first output information set and the second output information include at least one of biological information and/or molecular sequence information.

14. The method of claim 11, wherein updating the first computational module includes removing one or more operations from the set of operations, adding one or more operations to the set of operations, and/or rearranging operations included in the set of operations.

15. The method of claim 11, wherein the update information includes updates to the first input information set, wherein updating the first computational workflow includes updating the first input information set to generate an updated input information set, and wherein the updated input information set is processed in accordance with the first workflow definition to generate the second output information set.

16. The method of claim 11, wherein the method further includes:
generating visual summaries of the variance information, wherein the visual summaries characterize differences between the first output information set and the second output information set documented in the variance information.

17. The method of claim 11, wherein the first computational module and the updated computational module are functionally analogous.

18. The method of claim 11, wherein the method further includes:
storing at least one of the updated workflow definitions to configure the first computational module, the updated computational module, the second output information set, or the variance information.

19. The method of claim 18, wherein the first output information set is stored in association with the first workflow definition, and wherein the second output information set is stored in association with the updated workflow definition.

20. The method of claim 18, wherein the updated workflow definition is stored as a second version of the first workflow definition to configure the first computational workflow.

* * * * *